United States Patent
He et al.

(10) Patent No.: US 8,620,951 B1
(45) Date of Patent: Dec. 31, 2013

(54) SEARCH QUERY RESULTS BASED UPON TOPIC

(75) Inventors: Jianming He, Cupertino, CA (US); Kevin D. Chang, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/486,742

(22) Filed: Jun. 1, 2012

Related U.S. Application Data

(60) Provisional application No. 61/591,904, filed on Jan. 28, 2012.

(51) Int. Cl.
*G06F 17/00* (2006.01)

(52) U.S. Cl.
USPC ........... 707/769; 707/608; 707/790; 707/813; 707/821; 707/899

(58) Field of Classification Search
USPC .................. 707/608, 769, 790, 913, 821, 899
See application file for complete search history.

(56) References Cited

U.S. PATENT DOCUMENTS

| | | | |
|---|---|---|---|
| 8,214,363 B2 | 7/2012 | Chaudhary | |
| 8,244,725 B2 | 8/2012 | Woosley et al. | |
| 8,244,750 B2 | 8/2012 | Gade et al. | |
| 8,250,024 B2 | 8/2012 | Mackintosh et al. | |
| 2010/0306249 A1* | 12/2010 | Hill et al. | 707/769 |
| 2012/0002884 A1* | 1/2012 | Ren et al. | 382/218 |
| 2012/0203778 A1 | 8/2012 | Riley et al. | |
| 2012/0215755 A1 | 8/2012 | Kumar et al. | |

* cited by examiner

*Primary Examiner* — Sana Al Hashemi
(74) *Attorney, Agent, or Firm* — Turocy & Watson, LLP

(57) ABSTRACT

Systems and methods for returning results to a query based upon topic are disclosed herein. Aspects disclosed can be particularly useful when searching for videos or other media content for which associated textual information are generally relatively sparse compared to other types of content. Text associated with the query can be semantically associated with various domain topics by mapping one or more words included in the query to one or more domain topics based upon a conditional probability of the domain topic given the query. A set of results can be identified based upon a conditional probability of the result given the domain topic.

20 Claims, 11 Drawing Sheets

US 8,620,951 B1

SEARCH QUERY RESULTS BASED UPON TOPIC

CROSS-REFERENCE TO RELATED APPLICATIONS

This application claims the benefit of U.S. Provisional Application No. 61/591,904, filed Jan. 28, 2012 and entitled SEARCH QUERY RESULTS BASED UPON TOPIC, the entirety of which is incorporated herein by reference.

TECHNICAL FIELD

This disclosure generally relates to returning results for search queries that are based upon topic rather than keyword alone.

BACKGROUND

Most conventional search engines that receive a query to determine which results to serve are based upon keywords included in the query. However, keyword-based search engines suffer from several shortcomings. First, there is an inherent requirement that the user knows appropriate keywords a priori in order for relevant results to be returned. Second, keyword-based search engines generally require that the results actually include an exactly matching keyword.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems and methods disclosed herein relate to providing results to a query based upon topic. An input component can be configured to receive a query, e.g., for a video. A mapping component can map a set of domain topics to the query. For example, a domain topic from the set of domain topics can be mapped to the query based upon a probability of the domain topic given the query, P(T|Q). A results component can be configured to identify a set of results for the query. For instance, a result from the set of results can be identified based upon a probability of the result given the domain topic, P(R|T). An output component can be configured to present the set of results.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
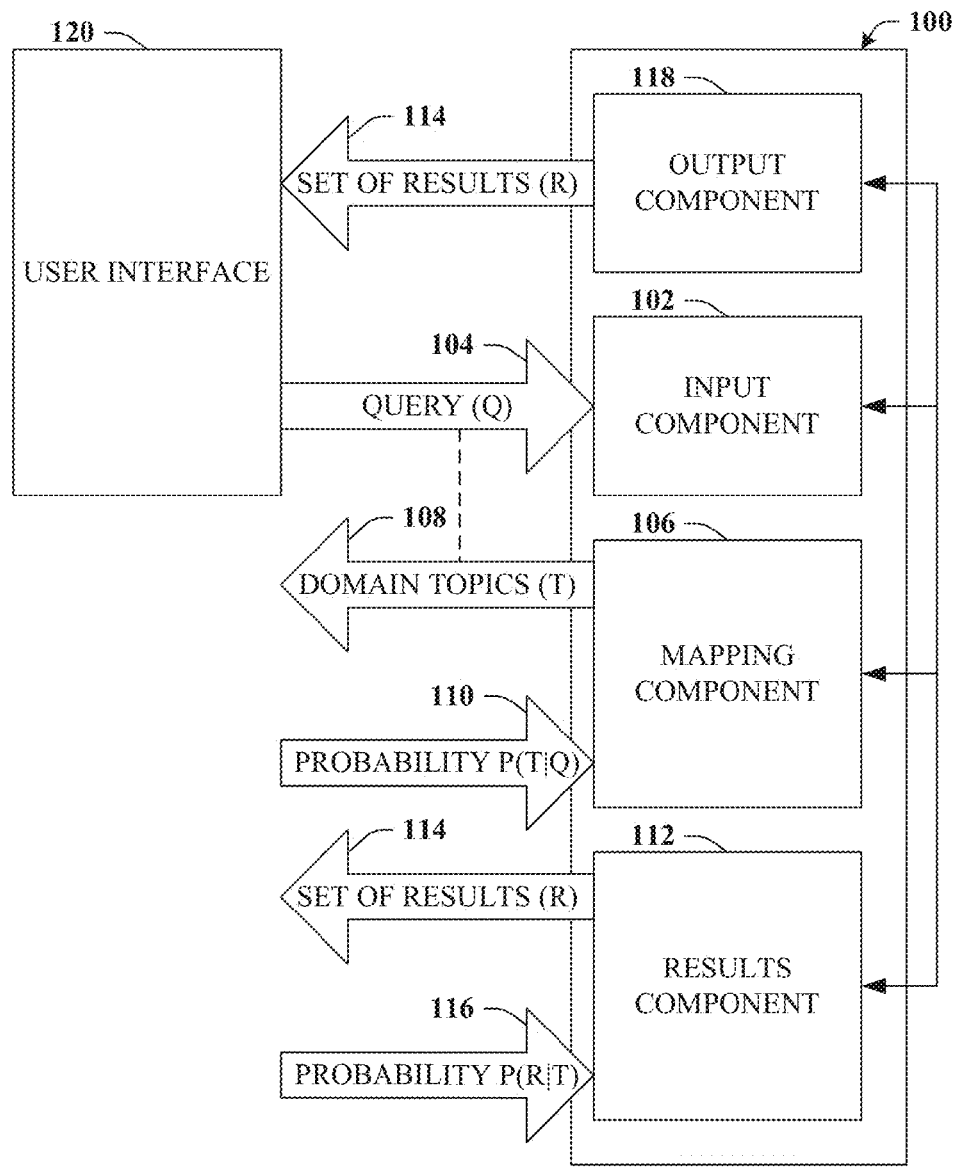
FIG. 1 illustrates a high-level block diagram of an example system that can provide topic-based results to a query in accordance with certain embodiments of this disclosure.

Systems and methods disclosed herein relate to providing results to a search query that are based upon topic. Conventional keyword-based search engines share a number of shortcomings that can be remedied or mitigated by a topic-based search engine. For example, many conventional keyword-based search engines require the user to know the exact keywords in advance. Many conventional keyword-based search engines also require the keyword to exist in the result. Such search engines will therefore exclude potentially interesting results that are related to the keyword (e.g., by topic of interest) but do not include the keyword.

In certain domains, these shortcomings of conventional keyword-based search engines can become especially problematic. For example, in the domain of videos or other media content, users often visit a content hosting site or service without a clear idea of what might be found or what might prove of interest. Therefore, keywords are often not particularly useful by themselves, or less useful or less efficient. Furthermore, textual information associated with videos or other media content are generally relatively sparse compared to other types of content. For instance, a web page can have a much larger set of text in which to match relevant keywords, whereas for media content, such text is often of a minimal nature. Therefore, when searching for media content with a conventional keyword-based search engine, a great deal of interesting content will not be served since those interesting content results lack the matching keyword(s).

Embodiments of the present disclosure can perform a topic-based query rather than relying upon keywords alone. By employing topic domains, the process of returning results to a query can be separated into two constituent tasks. First, domain topics can be identified based upon the query. Second, representative results for those domain topics can be located. Such tasks can be accomplished by analyzing suitable statistics associated with past queries and computing various conditional probabilities.

The conditional probability of a domain topic given a query, P(T|Q), can be employed to map domain topics to the query. The conditional probability of a result given a domain topic, P(R|T), can be employed to identify results for a topic-based search. These two probabilities, P(T|Q) and P(R|T), can be determined by various means detailed herein. In some embodiments, certain probabilities used to determine one or both P(T|Q) and P(R|T) can be determined by external components, and those externally-produced probabilities can be leveraged, if available.

By way of example, consider a search query that includes the word "Judas." That word, "Judas" can be mapped to certain domain topics such as "Born This Way" and "Lady Gaga." "Born This Way" is the name of a popular album that includes a song called "Judas," and "Lady Gaga" is the artist who created that album and performed the song "Judas." A conventional keyword-based search engine would only return results with the word "Judas;" however, the disclosed topic-based results can include results that are relevant, even if those results do not include the word "Judas." For example, such relevant results can include the words "Lady Gaga" or "Born This Way" and so forth. The topic-based search results can therefore include many other results from the same album or by the same artist, even when the user is not aware of the titles of those related songs.

Example Search Results Based Upon Topic

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

Referring now to FIG. 1, a system 100 is depicted. System 100 can respond to a search query with search results that are based upon topic. System 100 can include a memory that stores computer executable components and a processor that executes computer executable components stored in the memory, examples of which can be found with reference to FIG. 10. In addition, system 100 can include an input component 102, a mapping component 106, a results component 112, and an output component 118.

Input component 102 can be configured to receive query 104. For example, query 104 can be received from user interface 120 that is associated with a device such as a computer, laptop, tablet, phone, television, console, or another suitable device. In some embodiments, query 104 can be a search query that includes one or more words or terms, which is further detailed in connection with FIG. 2. Query 104 can be directed to a search of videos or other media content, such as videos stored at a video hosting site or service.

Mapping component 106 can be configured to map query 104 to set of domain topics 108. A domain topic included in set of domain topics 108 can be mapped to query 104 based upon probability 110 of the domain topic given query 104. As used herein, a domain topic from set of domain topics 108 can be represented or referred to as "T" (e.g., topic), and query 104 (or one or more words or terms included therein) can be represented or referred to as "Q". The probability 110 of the domain topic given query 104 that is utilized to map the domain topic to query 104 can therefore be represented as P(T|Q), in accordance with conditional probability convention.

Results component 112 can be configured to identify set of results 114. In one or more embodiments, a result from set of results 114 can be a reference to a video stored at a video hosting site or service. Results component 112 can identify the result based upon a probability 116 of the result given the domain topic 108. As used herein, a result included in set of results 114 can be represented or referred to as "R". Therefore, probability 116 (e.g., the probability of the result given the domain topic) can be represented herein as P(R|T). Additional detail relating to probabilities 110, 116 can be found with reference to FIGS. 4 and 5.

Output component 118 can be configured to present set of results 114. For example, set of results 114 can be presented to user interface 120, from which query 120 was received. Further detail relating to outputting set of results 114 is provided in connection with FIG. 3.

While conventional search engine results are generally achieved by matching keywords, embodiments of this disclosure can provide results based upon domain topic similarities and/or relationships. At a high level, such can be accomplished by separating the difficulty of identifying results for a query into two parts. First, identify a domain topic given a query (e.g., using probability 110, P(T|Q)). Second, identify representative results for certain domain topics (e.g., using probability 116, P(R|T)). Set of results 114 can therefore be returned that have a high probability of being related to query 104 even though these results might not include any keyword extant in query 104.

For example, a user might input the text "astronomy" into a search box included in user interface 120 so that input component 102 receives "astronomy" as query 104 or a part of query 104. Set of results 114 returned to the user in response can include, for instance, a result that references a video entitled "Hubble images" that includes a compilation of popular Hubble telescope photographs. The result that references the Hubble images can be returned even though the keyword "astronomy" does not appear anywhere in the result. Rather, this result can be returned because, e.g., (1) it is established that "astronomy" and "Hubble images" are related concepts, and; (2) the result is popular according to certain indicative metrics (e.g., views, likes, etc.).

Figure 2:
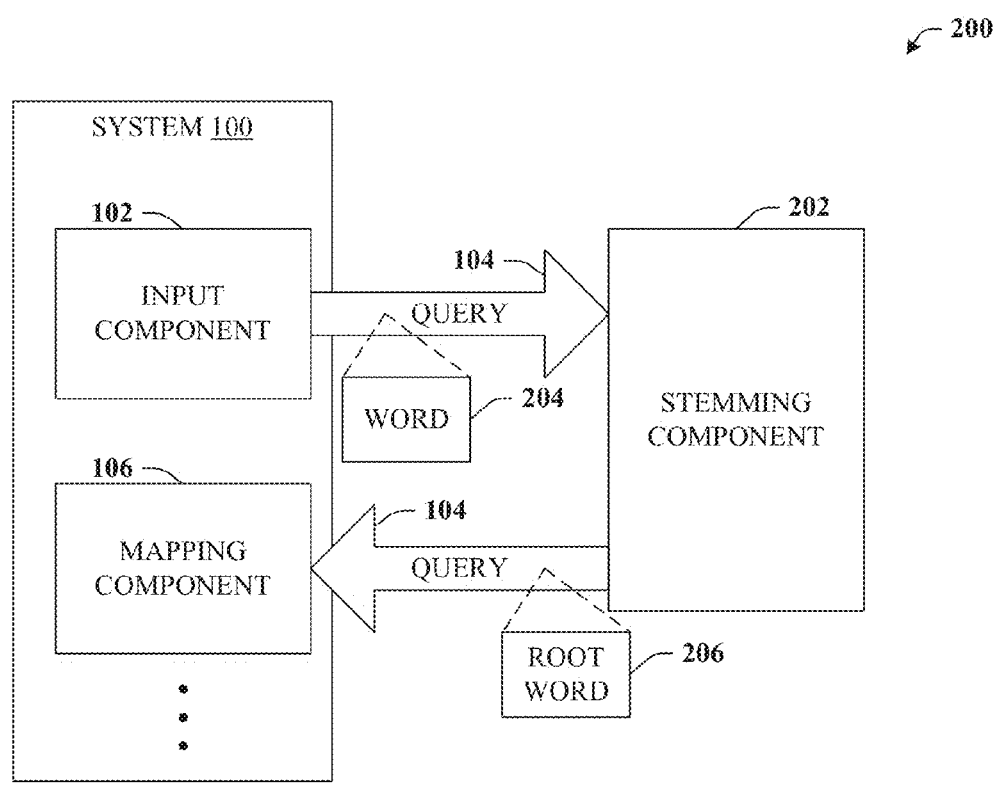
FIG. 2 depicts an example block diagram of a system that can provide for stemming in connection with query in accordance with certain embodiments of this disclosure.

Turning now to FIG. 2, system 200 is illustrated. System 200 can provide for stemming in connection with query 104. System 200 can include all or portions of system 100 such as input component 102 that can receive query 104 and mapping component 106 that can map query 104 to set of domain topics 108.

System 200 can also include stemming component 202. Stemming component 202 can receive query 104, e.g., formatted exactly as was received by input component 102. In this original format, a given word (e.g., word 204) included in query 104 can be in a variety of forms, any of which can be derived from root word 206. For instance the words "being" and "been" can be derived from the root word "be." Likewise, the words "laughter," "laughing," and "laughed" can be derived from the word "laugh." In one or more embodiments, root word 206 can be a synonym for another word as well. Hence, "laugh" might represent root word 206 for any or all of the following words 204: laughter, laughing, laughed, comic, comedy, humor, humorous, and so forth.

Stemming component 202 can be configured to identify at least one root word 206 associated with word 204 included in query 104. Stemming component 202 can replace word 204 included in query 104 with root word 206. Whether or not a particular word 204 is stemmed, mapping component 106 can map query 104 to the associated topic domain in any of the various embodiments.

Figure 3:
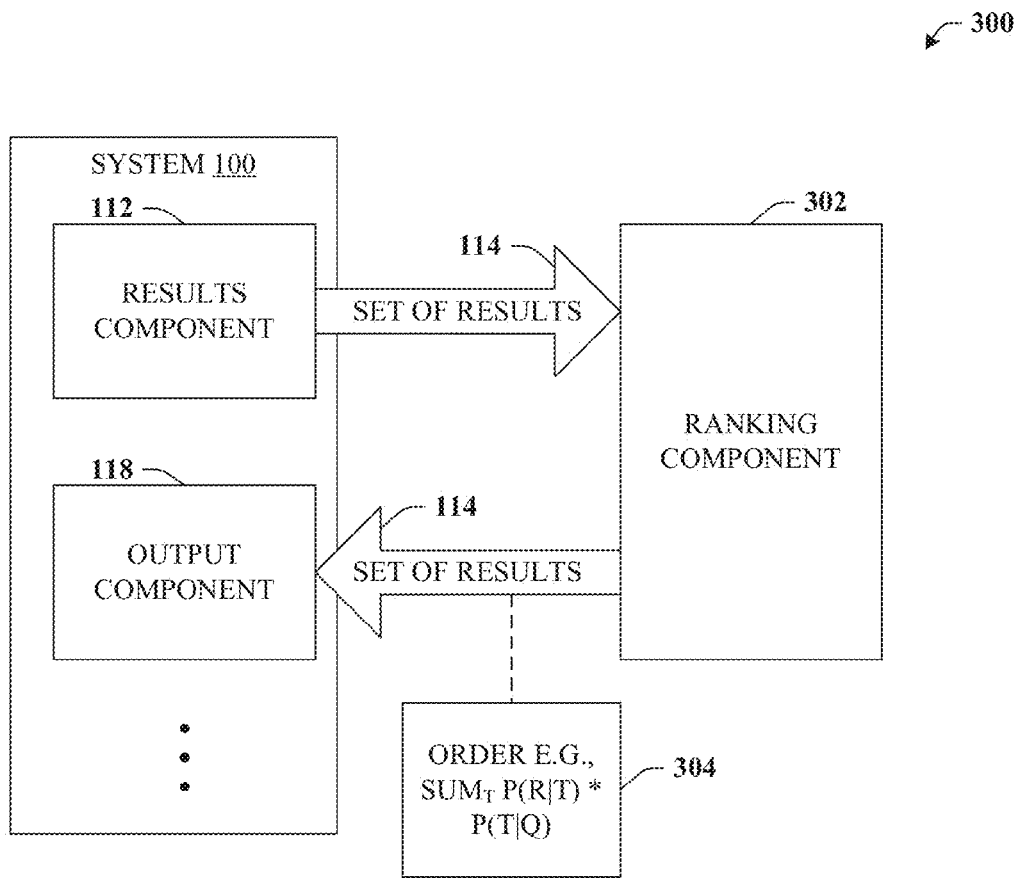
FIG. 3 illustrates a block diagram of a system that can provide for ordered output of the set of results in accordance with certain embodiments of this disclosure.

Referring now to FIG. 3, system 300 is depicted. System 300 can provide for ordered output of set of results 114. System 300 can include all or portions of system 100 such as results component 112 that can identify set of results 114 and output component 118 that can provide set of results 114 for presentation.

System 300 can also include ranking component 302 that can receive set of results 114, wherein the results are ordered according to the output of results component 112. Ranking component 302 can be configured to order (e.g., order 304) set of results 112 based upon a relevance to query 104. In some embodiments, the relevance to query 104 can be determined as a product of the probability of the result given the domain topic and the probability of the domain topic given the query. Hence, the relevance for each result that is employed to construct order 304 can be: relevance=$\text{Sum}_T$ P(R|T)*P(T|Q).

Figure 4:
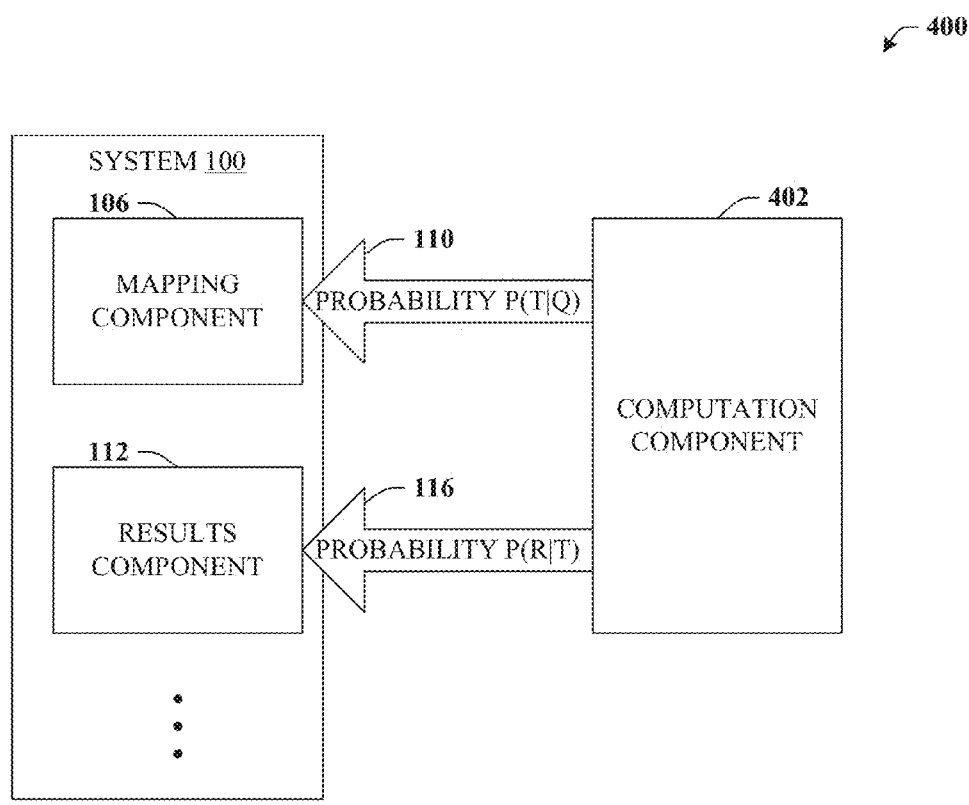
FIG. 4 illustrates a block diagram of a system that can construct P(T|Q) and P(R|T) in accordance with certain embodiments of this disclosure.

With reference now to FIG. 4, system 400 is depicted. System 400 can construct P(T|Q) and P(R|T). System 400 can include all or portions of system 100 such as mapping component 106 that can map the domain topic to the query based upon P(T|Q) (probability 110) and results component 112 that can identify a result based upon P(R|T) (probability 116).

System 400 can include computation component 402 that can be configured to calculate probability 110 of the domain topic given query 104, P(T|Q), and probability 116 of the result given the domain topic, P(R|T). These calculated probabilities 110, 116 can be provided to previously detailed components included in system 100 such as mapping component 106 and/or results component 112. Various example mechanisms of calculating probabilities 110, 116 are detailed in connection with FIG. 5, infra.

Figure 5:
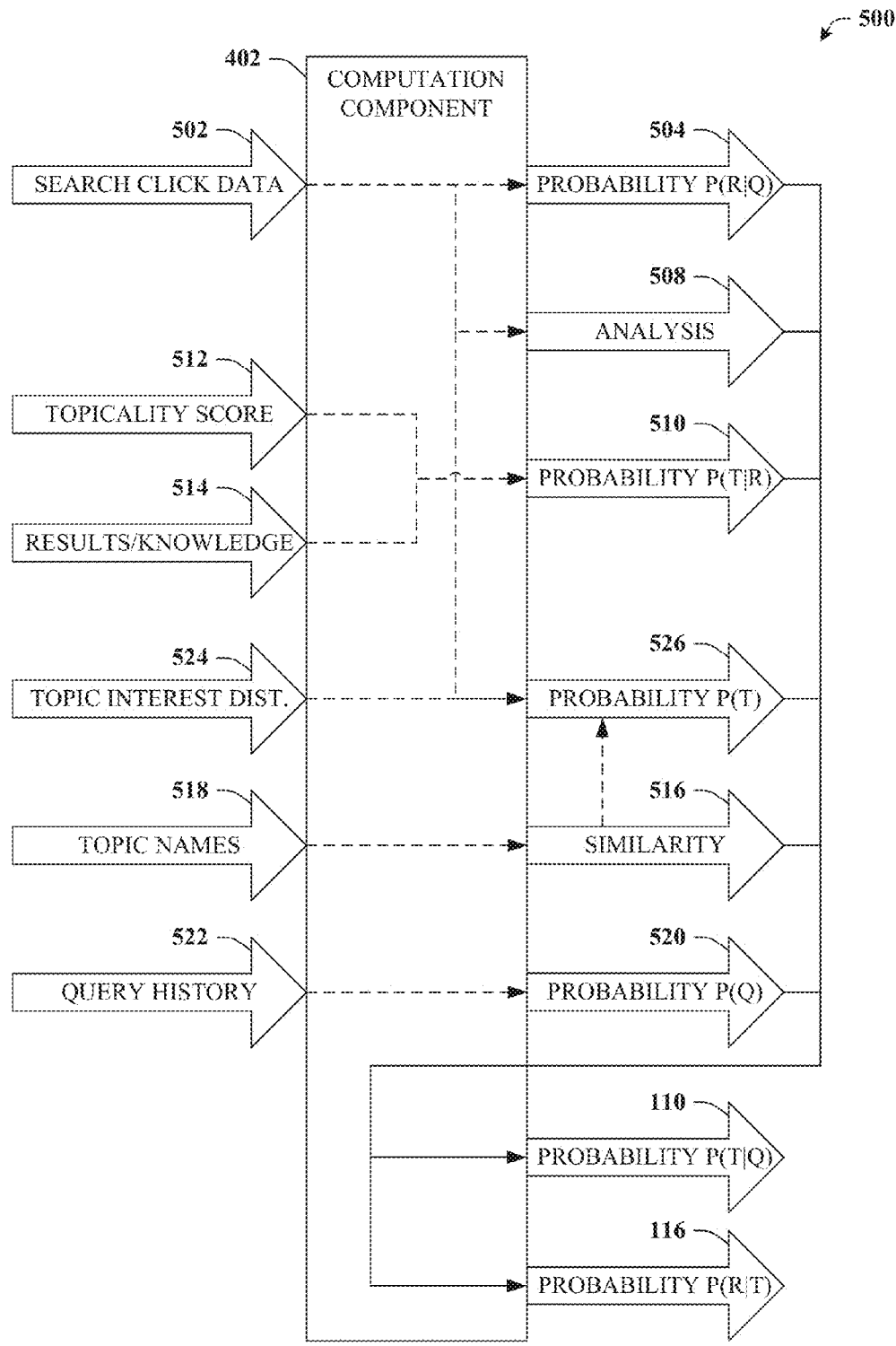
FIG. 5 illustrates a block diagram of an example system that can provide for various examples of computing P(T|Q) and P(R|T) in accordance with certain embodiments of this disclosure.

Turning now to FIG. 5, system 500 is illustrated. System 500 depicts various examples of computation component 402 computing P(T|Q) and P(R|T). As detailed previously, determining a result given a query can be separated into two subparts: (1) determining probability 110 of a domain topic given the query; and (2) determining probability 116 of a result given a domain topic. Determining a relevant query result based upon a topic can be particularly beneficial in domains in which results are media-based rather than text-based. For example, a website with many pages of text and a number of metadata tags has a higher chance of being matched based upon keyword searches. In contrast, a video with only a title or a few other choice textual descriptors is much less likely to be discovered by keyword-based searches. However, such difficulties can be mitigated by providing topic-based results to searches.

In one or more embodiments, computation component 402 can calculate probability 110 of the domain topic given query 104 based upon probability 504 of a result given a query (e.g., P(R|Q)) that is derived from an examination of search click data 502. Search click data 502 can include substantially all reference links and other selections stored by a content hosting site or service or by an agent thereof or a third party. Once probability 504 is determined, computation component 402 can calculate probability 110 of the domain topic given query 104 (e.g., P(T|Q)) based upon analysis 508 of search click data 502 that are associated with the domain topic and query 104. Analysis of search click data 502 can be employed to estimate probabilities 110 and/or 116. For example, using P(T|Q)=$\text{Sum}_R$ P(T|R,Q)*P(R|Q). Assuming T and Q are independent given R, P(T|Q)=$\text{Sum}_R$ P(T|R,Q)* P(R|Q)=$\text{Sum}_R$ P(T|R)*P(R|Q).

Hence, probability 110 (e.g., P(T|Q)) can be calculated by first determining probability 504 (e.g., P(R|Q)) and probability 510 (e.g., P(T|R)). Probability 504 can be determined based upon an analysis of search click data 502. Probability 510 can be determined in various ways. In one or more embodiments, computation component 402 can determine probability 510 of the domain topic given the result based upon topicality score 512.

For example, a video hosting site can annotate videos (or other content that can serve as a result to a search query 104) with certain entities. Such entities can relate to, e.g., topics, artists, significant concepts, external curators, and so forth. Such annotations can be determined by the video hosting site by comparing textual information included in the video with one or more semantic knowledge databases. By leveraging the knowledge databases, the video site can establish implicit semantic concepts that exist in the videos. For instance, consider a music video that is labeled only with the title of the song, "Judas." Based upon the semantic inferences, this music video can be annotated with other relevant concepts such as artist, "Lady Gaga," and the album, "Born This Way," regardless of whether or not those terms were explicitly listed in the description of the video. The relevant concepts added, in this case artist ("Lady Gaga") and album ("Born This Way"), can be each be associated with a probability score that reflects relevance. This probability score for the relevance can be received as topicality score 512, which can be used as probability 510 or converted to probability 510.

In another embodiment, computation component 402 can determine the probability 510 of the domain topic given the result P(T|R) based upon a comparison of strings between text associated with a result and at least one knowledge database, both of which can be received via input 514. If the video hosting site is not equipped to provide topicality score 512, then computation component 402 can determine a similar value. For example, computation component 402 can obtain entries from various available knowledge databases (e.g., freebase, Wikipedia, etc.). These entries can be treated as domain topics. Given a video from the video hosting site, the entries can be identified by string matching based upon the video text description. The occurrence of each entry can be approximated as topicality score 512.

In other embodiments, computation component 402 can calculate probability 110 of the domain topic given query 104 (e.g., P(T|Q)) based upon string similarity 516 between query 104 and a string name of the domain topic. The string name of the domain topics can be received by computation component 402 via topic names 518.

As detailed above, computation component 402 can determine probability 504 (e.g., P(R|Q)) and probability 510 (e.g., P(T|R)), which can be employed to determined probability 110 (e.g., P(T|Q)). Computation component 402 can also determine probability 116 (e.g., P(R|T). For example, P(R|T)=$\text{Sum}_Q$ P(R|Q,T)*P(Q|T). Assuming T and R are independent given Q, then, P(R|T)=$\text{Sum}_Q$ P(R|Q)* P(Q|T)=$\text{Sum}_Q$ P(R|Q)*P(T|Q)*P(Q)/P(T).

Computation component 402 previously determined P(R|Q) (e.g., probability 504) and P(T|Q) (e.g., probability 110). P(T) (e.g., probability 526) can be obtained from domain knowledge or from a function of how frequently a video with domain topic 108 is clicked and/or presented.

Probability 526 of the domain topic (e.g., P(T)) can be determined based upon search click data 502, topic interest distribution 524, and/or similarity 516. For example, the following can be used: $P(T)=\text{Sum}_T P(R|T)*P(T|Q)$. Topic interest distribution 524 can relate to a distribution of topic interests. Topic interest distribution 524 can be received from the content hosting site or service, or another suitable party. P(Q) (e.g., probability 520) can be determined as a function of a number of times query 104 was received relative to query history 522. Computation component 402 can determine probability 116 as a function of probability 504, probability 110, probability 520, and probability 526.

FIGS. 6-9 illustrate various methodologies in accordance with certain embodiments of this disclosure. While, for purposes of simplicity of explanation, the methodologies are shown and described as a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media.

Figure 6:
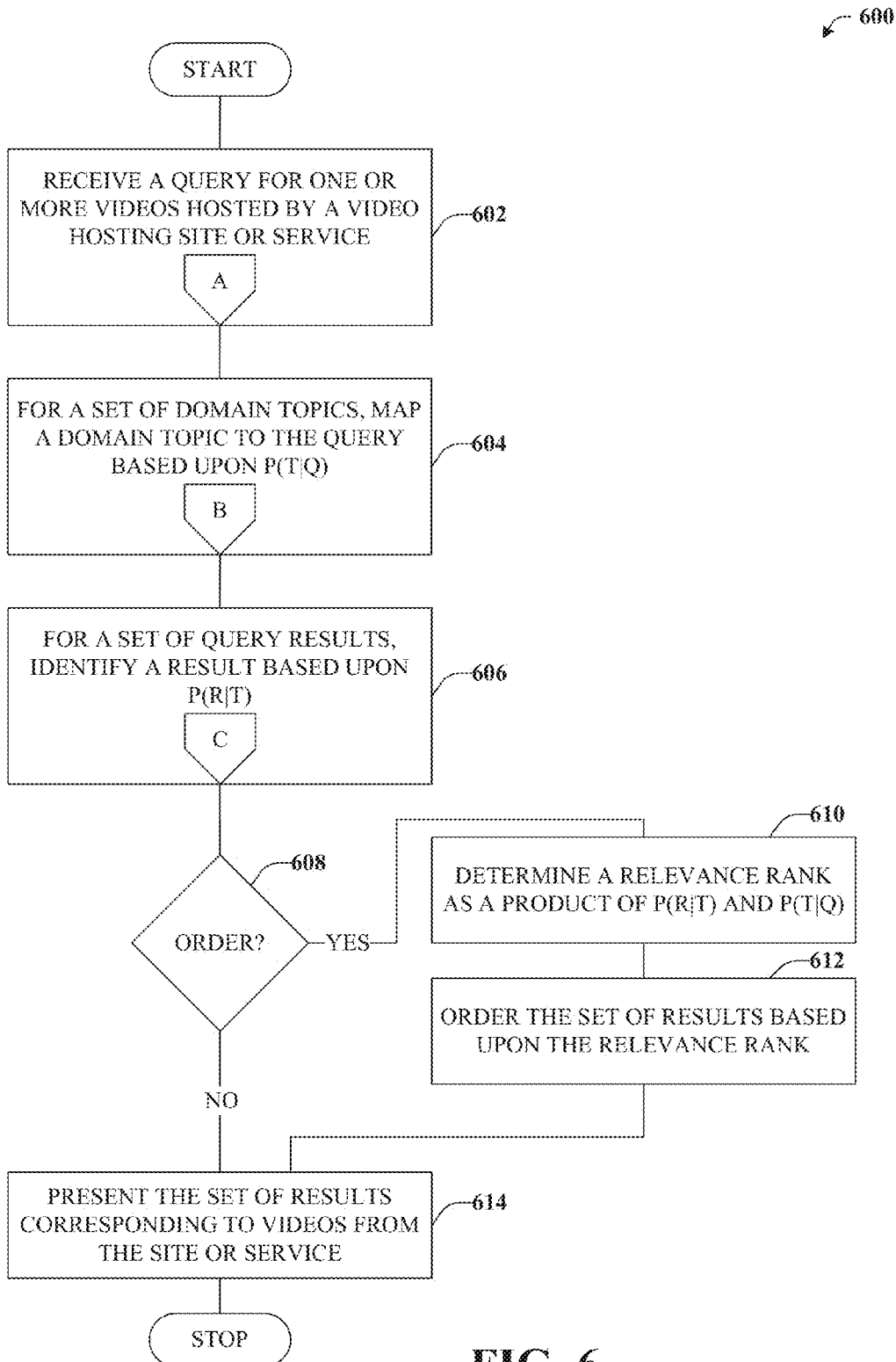
FIG. 6 illustrates an example methodology for providing results to a query based upon topic in accordance with certain embodiments of this disclosure.

Turning now to FIG. 6, exemplary method 600 is depicted. Method 600 can provide for results to a query based upon topic. Generally, at reference numeral 602, a query for one or more videos hosted by a video hosting site or service can be received, e.g., by an input component. For example, the query can be directed to searching the data stores of the video hosting site or service, e.g., to locate particular videos.

At reference numeral 604, the query can be mapped (e.g., by a mapping component) to a set of domain topics. A domain topic from the set of domain topics can be mapped to the query based upon a probability of the domain topic given the query, P(T|Q).

At reference numeral 606, a set of results for the query can be identified (e.g., by a results component). A result from the set of results can be identified based upon a probability of the result given the domain topic, P(R|T). At reference numeral 608 an optional decision to order the results can be made. If no decision is performed or if a decision is made in the negative, then reference numeral 614 can be performed. Otherwise, if the decision at reference numeral 608 is performed, and that decision is "Yes", then reference numerals 610 and 612 can be performed.

At reference numeral 610, a relevance rank can be determined as a product of the probability of the result given the domain topic and the probability of the domain topic given the query (e.g., P(R|T)*P(T|Q)). At reference numeral 612, the set of results can be ordered based upon the relevance rank.

At reference numeral 614, the set of results corresponding to videos hosted by the video hosting site or service can be presented. The results can be ordered according to the relevance rank or otherwise.

Figure 7:
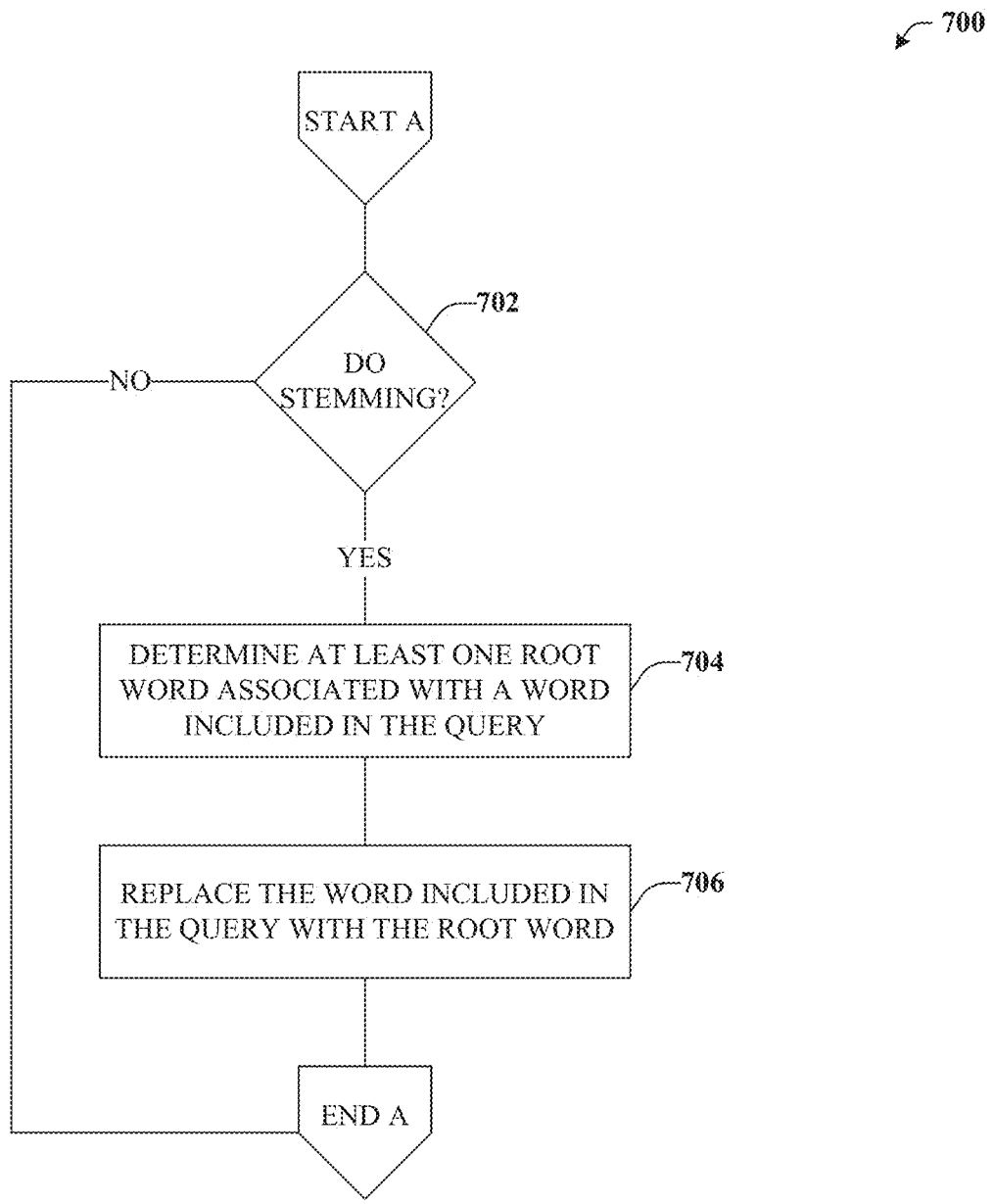
FIG. 7 illustrates an example methodology for stemming the query in accordance with certain embodiments of this disclosure.

Referring now to FIG. 7, exemplary method 700 for stemming the query is depicted. At reference numeral 702, a decision is made as to whether or not to engage in stemming prior to mapping the domain topic to the query detailed at reference numeral 604 of FIG. 6. If the decision is "No," then no stemming is employed and the query is passed as originally input. If the decision is "Yes," then the method proceeds to reference numeral 704.

At reference numeral 704, at least one root word associated with a word included in the query is determined, e.g., by a stemming component. For example, if the query includes the word "tallest" or "taller," then the root word, "tall" can be determined in both cases. At reference numeral 706, the word included in the query can be replaced with the root word. For instance, the query that originally included the word "tallest" will now include the word "tall" instead.

Figure 8:
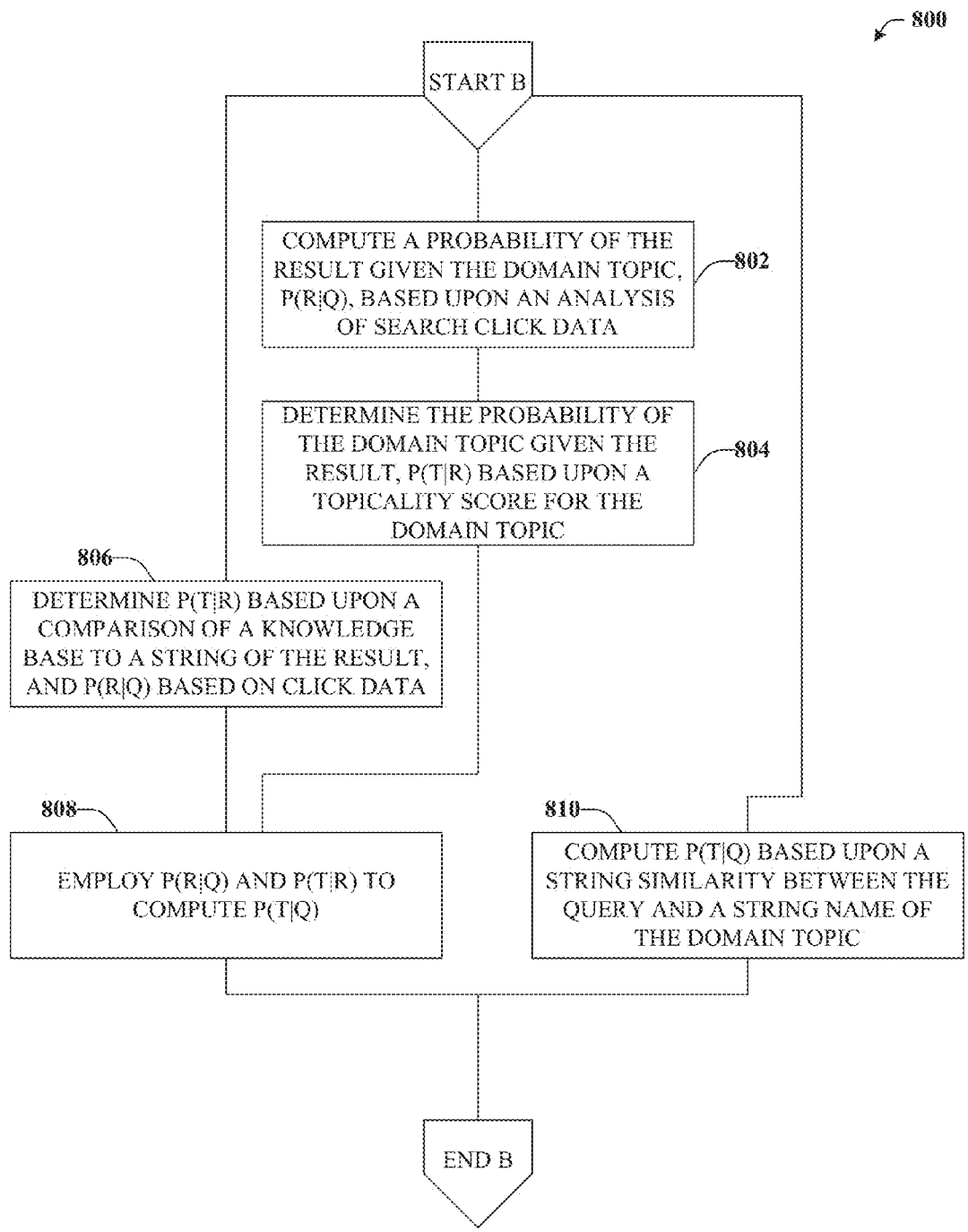
FIG. 8 illustrates an example methodology for determining the probability of the domain topic given the query, P(T|Q) in accordance with certain embodiments of this disclosure.

Turning now to FIG. 8, example method 800 is illustrated. Method 800 relates to determining the probability of the domain topic given the query, P(T|Q), which is utilized at reference numeral 604 to map the domain topic to the query. Method 800 can follow any of the illustrated paths, beginning with reference numeral 802, 806, or 810. At reference numeral 802, the probability of the result given the domain topic, P(R|Q), can be determined based upon an analysis of search click data.

At reference numeral 804, the probability of the domain topic given the result, P(T|R), can be determined based upon a topicality score for the domain topic. The topicality score can be received from the video hosting site or service. As another example, and by beginning method 800 at reference numeral 806, P(T|R) can be determined based upon a comparison of a knowledge base to a string associated with the result and P(R|Q) can be determined based upon search click data.

At reference numeral 808, P(R|Q) determined at reference numeral 802 (or 806) and P(T|R) determined at reference numeral 804 (or 806) can be employed to compute P(T|Q), the probability of the domain topic given the query. At reference numeral 810, P(T|Q) can be computed based upon a string similarity between the query and a string name of the domain topic.

Figure 9:
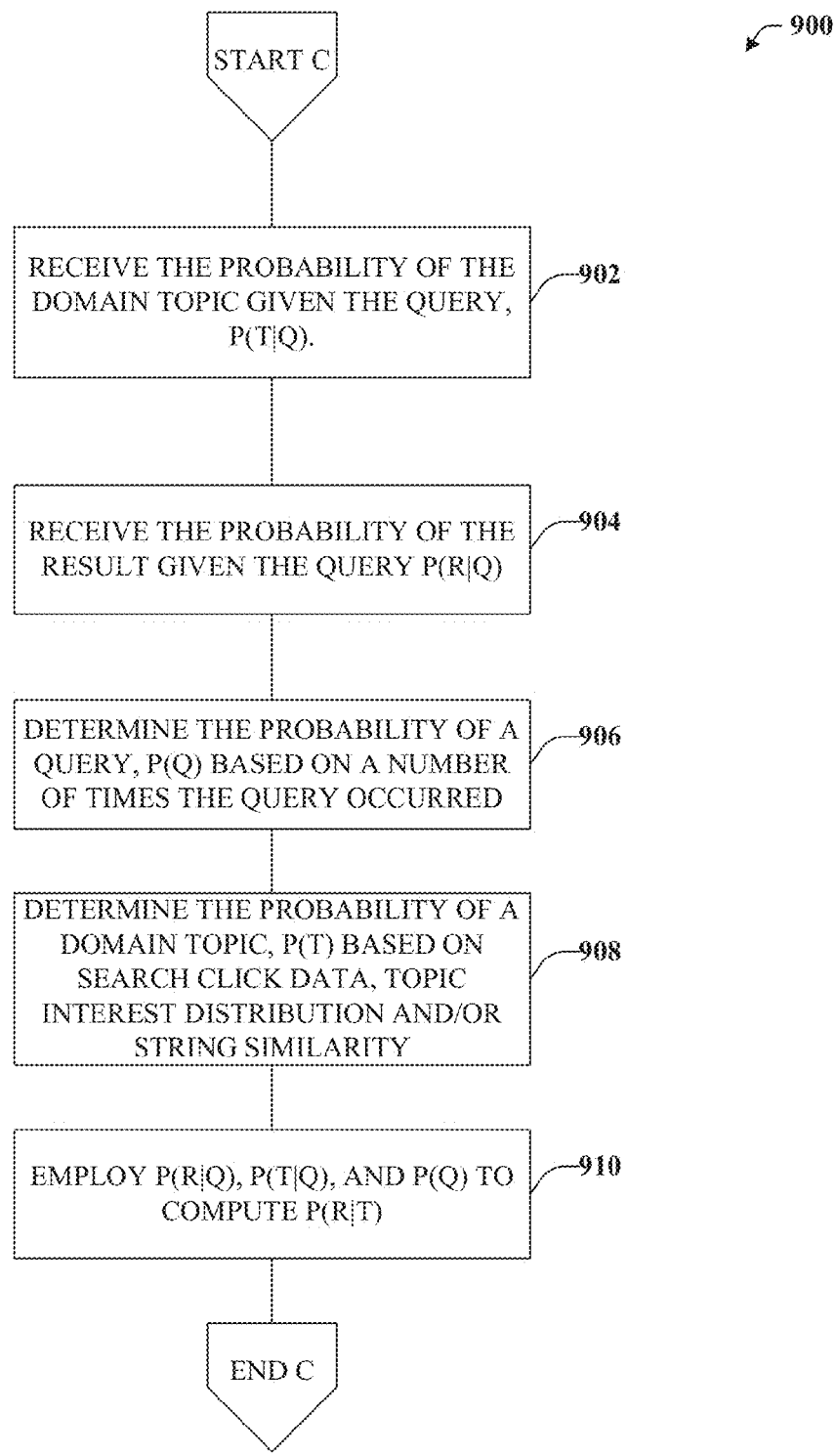
FIG. 9 illustrates an example methodology for determining the probability of the result given the domain topic, P(R|T) in accordance with certain embodiments of this disclosure.

Referring to FIG. 9, example method 900 is depicted. Method 900 relates to determining the probability of the result given the domain topic, P(R|T), which is utilized at reference numeral 606 to identify the result. In order to determine P(R|T), the probability of the domain topic given the query, P(T|Q) can be utilized. At reference numeral 902, P(T|Q) can be received as was calculated at reference numeral 808. In other embodiments, P(T|Q) can be determined in other ways, such as according to reference numeral 810, where P(T|Q) is computed based upon a string similarity between the query and a string name associated with the domain topic.

At reference numeral 904, the probability of the result given the query, P(R|Q) can be received. For example, P(R|Q) can be received upon its determination at reference numeral 802 or 806. At reference numeral 906, the probability of the query, P(Q) can be determined based upon a number of times the query occurred. At reference numeral 908 the probability of a domain topic, P(T), can be determined based upon search click data, topic interest distribution, and/or string similarities. At reference numeral 910, P(R|Q), P(T|Q), P(T), and P(Q) can be employed to compute P(R|T), the probability of the result given the domain topic.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 10:
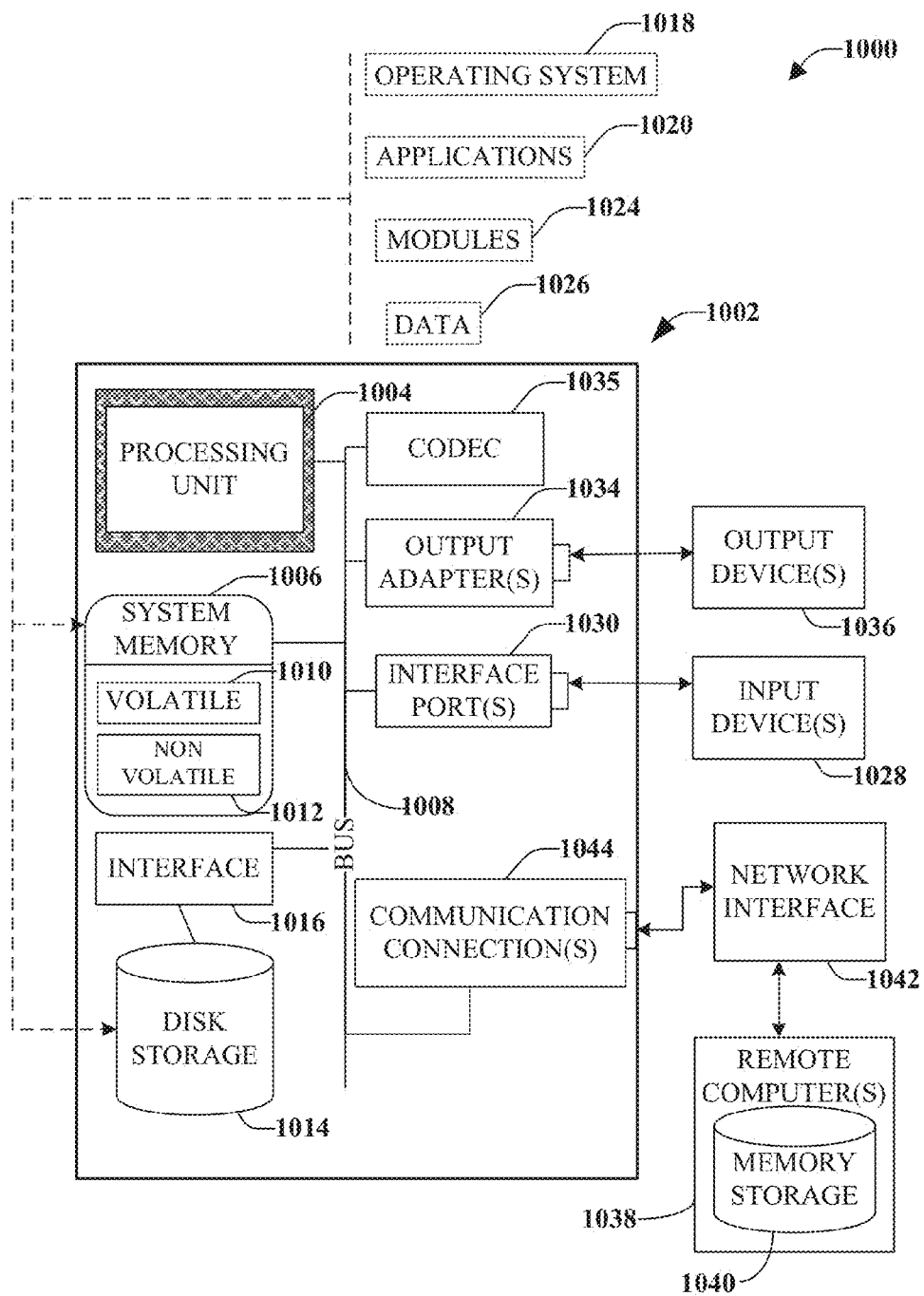
FIG. 10 illustrates an example schematic block diagram for a computing environment in accordance with certain embodiments of this disclosure.

With reference to FIG. 10, a suitable environment 1000 for implementing various aspects of the claimed subject matter includes a computer 1002. The computer 1002 includes a processing unit 1004, a system memory 1006, a codec 1035, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1035 may include at least one of an encoder or decoder, wherein the at least one of an encoder or decoder may consist of hardware, software, or a combination of hardware and software. Although, codec 1035 is depicted as a separate component, codec 1035 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016. It is appreciated that storage devices 1014 can store information related to a user. Such information might be stored at or provided to a server or to an application running on a user device. In one embodiment, the user can be notified (e.g., by way of output device(s) 1036) of the types of information that are stored to disk storage 1014 and/or transmitted to the server or application. The user can be provided the opportunity to opt-in or opt-out of having such information collected and/or shared with the server or application (e.g., by way of input from input device(s) 1028).

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
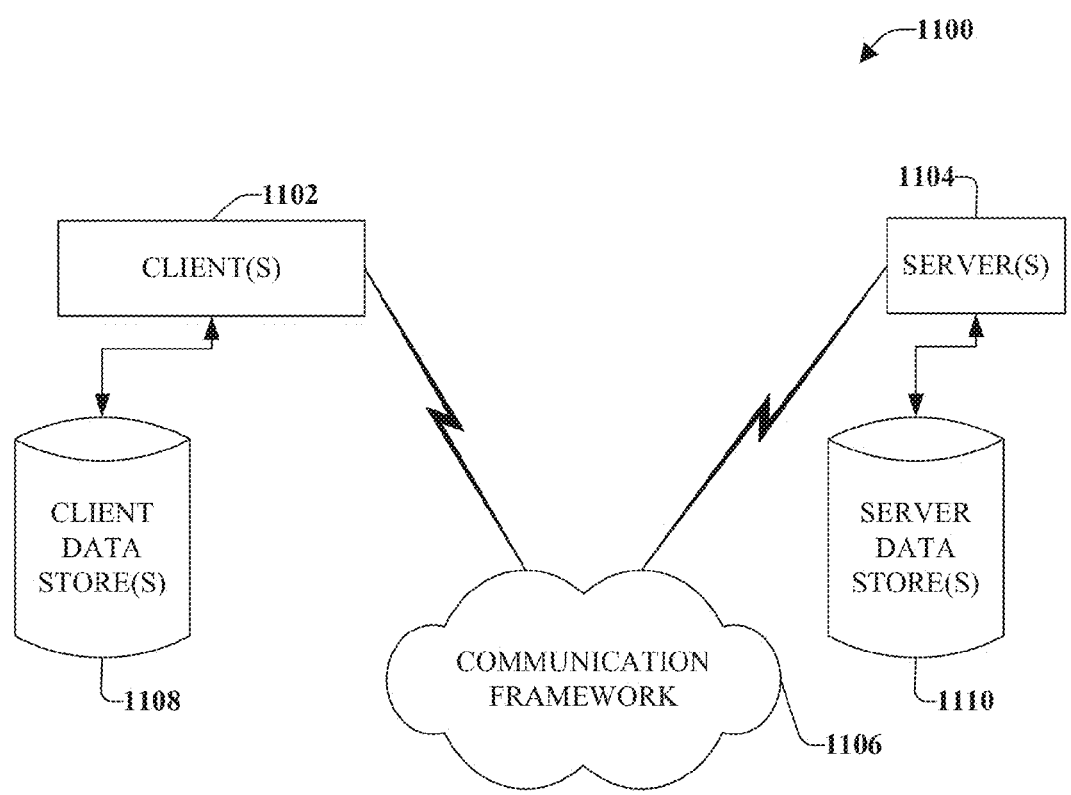
FIG. 11 illustrates an example block diagram of a computer operable to execute certain embodiments of this disclosure.

Referring now to FIG. 11, there is illustrated a schematic block diagram of a computing environment 1100 in accordance with this specification. The system 1100 includes one or more client(s) 1102 (e.g., laptops, smart phones, PDAs, media players, computers, portable electronic devices, tablets, and the like). The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include a cookie and/or associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A topic-based search query system, comprising:
   a memory that stores computer executable components; and
   a microprocessor that executes the following computer executable components stored in the memory:
      an input component that receives a query;
      a mapping component that maps the query to a set of domain topics, wherein a domain topic from the set of domain topics is mapped to the query based upon a first conditional probability, $P(T|Q)$, of the domain topic given the query;
      a results component that identifies a set of results for the query, wherein a result from the set of results is identified based upon a second conditional probability, $P(R|T)$, of the result given the domain topic; and
      an output component that presents the set of results.

2. The system of claim 1, further comprising a ranking component that orders the set of results based upon a relevance to the query.

3. The system of claim 2, further comprising a computation component that determines the relevance to the query as a product of $P(R|T)$ and a third conditional probability, $P(Q|T)$, of the domain topic given the query.

4. The system of claim 1, further comprising a stemming component that identifies at least one root word associated with a word included in the query and replaces the word included in the query with the root word.

5. The system of claim 1, further comprising a computation component that calculates $P(R|T)$ and $P(T|Q)$.

6. The system of claim 5, wherein the computation component calculates $P(T|Q)$ based upon a fourth conditional probability of the result given the query, $P(R|Q)$, that is derived from an analysis of search click data.

7. The system of claim 5, wherein the computation component determines $P(T|Q)$ based upon an analysis of results that are associated with the domain topic and the query.

8. The system of claim 5, wherein the computation component calculates $P(T|Q)$ based upon a string similarity between the query and a string name of the domain topic.

9. The system of claim 5, wherein the computation component determines a fifth conditional probability, $P(T|R)$, of the domain topic given the result.

10. The system of claim 9, wherein the computation component employs $P(T|R)$ to calculate $P(T|Q)$.

11. The system of claim 9, wherein the computation component employs a probability of the query, $P(Q)$, to calculate $P(R|T)$, wherein $P(Q)$ is a function of a number of times the query was received relative to a history of queries received.

12. The system of claim 9, wherein the computation component determines the $P(T|R)$ based upon a topicality score for the domain topic received by the computation component.

13. The system of claim 9, wherein the computation component determines $P(T|R)$ based upon a comparison of a string between text associated with the result and at least one knowledge database.

14. A method for providing results to a query based upon topic, comprising:
   employing a computer-based processor to execute computer executable components stored within a memory to perform the following:
      receiving a query for one or more videos hosted by a video hosting site or service;

mapping the query to a set of domain topics, wherein the mapping includes mapping a domain topic from the set of domain topics to the query based upon a first conditional probability, P(T|Q), of the domain topic given the query;

identifying a set of results for the query, wherein the identifying includes identifying a result from the set of results based upon a second conditional probability, P(R|T), of the result given the domain topic; and presenting the set of results corresponding to videos hosted by the video hosting site or service.

15. The method of claim 14, further comprising computing the first conditional probability of the domain topic given the query and the second conditional probability of the result given the domain topic.

16. The method of claim 15, further comprising computing the first conditional probability of the domain topic given the query based upon a third conditional probability, P(R|Q), of the result given the query, wherein the third conditional probability is derived from an analysis of search click data.

17. The method of claim 16, further comprising computing the first conditional probability of the domain topic given the query based upon an analysis of results that are associated with the domain topic and the query.

18. The method of claim 15, further comprising computing the first conditional probability of the domain topic given the query based upon a string similarity between the query and a string name of the domain topic.

19. The method of claim 15, further comprising determining a fourth conditional probability, P(T|R), of the domain topic given the result.

20. A system for providing results to a query based upon topic, comprising:

component for receiving a query for one or more videos hosted by a video hosting site or service;

component for mapping the query to a set of domain topics, wherein the mapping includes mapping a domain topic from the set of domain topics to the query based upon a first conditional probability, P(T|Q), of the domain topic given the query;

component for identifying a set of results for the query, wherein the identifying includes identifying a result from the set of results based upon a second conditional probability, P(R|T), of the result given the domain topic; and component for presenting the set of results corresponding to videos hosted by the video hosting site or service.

* * * * *